April 23, 1974
C. E. TERRY
METHOD OF APPLYING A SECONDARY BACKING MATERIAL TO PREVIOUSLY TUFTED PRIMARY BACKING MATERIAL
Filed Nov. 9, 1971

3,806,385

United States Patent Office 3,806,385
Patented Apr. 23, 1974

3,806,385
METHOD OF APPLYING A SECONDARY BACKING MATERIAL TO PREVIOUSLY TUFTED PRIMARY BACKING MATERIAL
C. Edward Terry, Rockmart, Ga., assignor to Textile Rubber and Chemical Company, Inc., Dalton, Ga.
Continuation-in-part of application Ser. No. 112,472, Feb. 3, 1971, now Patent No. 3,705,834, dated Dec. 12, 1972, which is a continuation-in-part of application Ser. No. 111,860, Feb. 2, 1971, now Patent No. 3,700,515, dated Oct. 24, 1972. This application Nov. 9, 1971, Ser. No. 197,022
The portion of the term of the patent subsequent to Oct. 24, 1989, has been disclaimed
Int. Cl. D05c 15/00
U.S. Cl. 156—72                                5 Claims

ABSTRACT OF THE DISCLOSURE

A conventional secondary backing material is secured to a previously tufted conventional primary backing material by a process involving the use of an essentially non-solvent, non-aqueous adhesive system which is stable under conventional materials handling conditions but may be made to polymerize and set or cure during a short period of time at either ambient or elevated temperatures. The process involves the continuous application of an adhesive to a previously tufted primary backing material and the positioning of a secondary backing material immediately adjacent the coated primary backing material so that light force may be applied to the two backing materials to bring them into engagement. After a proper positioning of the two backing materials, the article is fed in continuous fashion around a series of heated drums with the secondary backing material immediately adjacent the surface of the heating drums. The drums supply sufficient heat to cause polymerization and curing of the adhesive in a relatively short period of time and complete the secondary backing application process.

CROSS-REFERENCE TO RELATED APPLICATION

Figure 1:
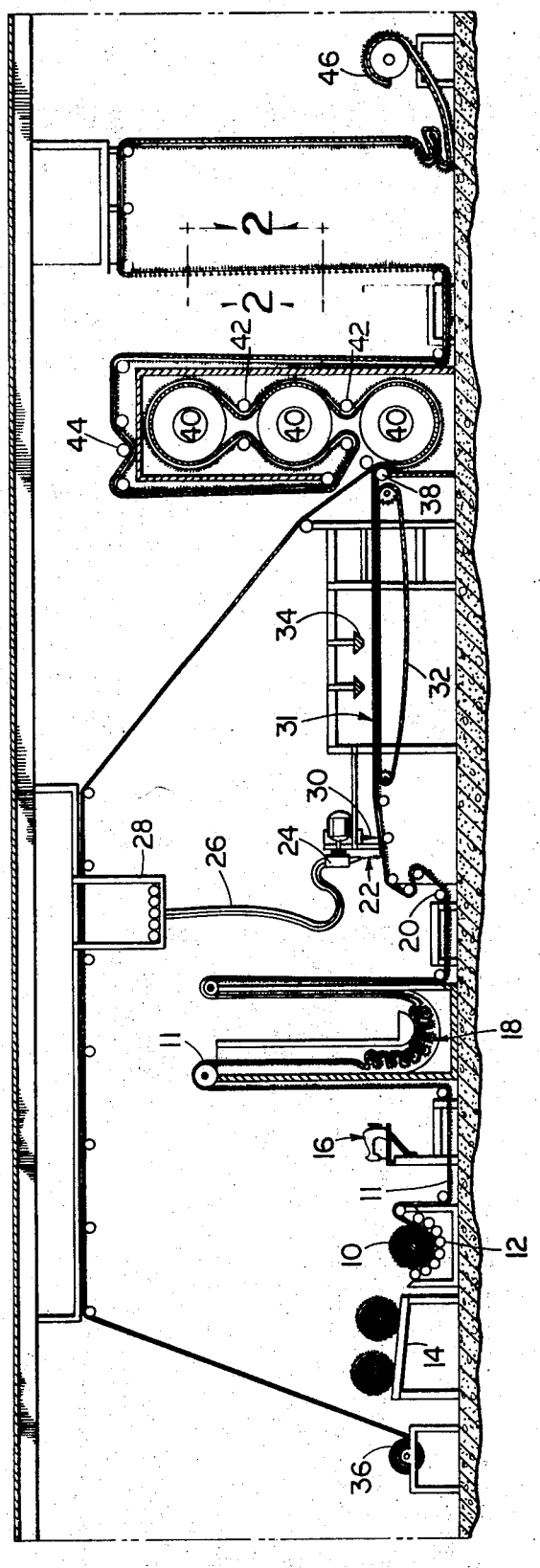

This application is a continuation-in-part of my co-pending application Ser. No. 112,472, filed Feb. 3, 1971 and entitled "Carpet With a Foam Polyurethane Backing," now U.S. Pat. No. 3,705,834, issued Dec. 12, 1972, which was in turn a continuation-in-part of my co-pending application Ser. No. 111,860, filed Feb. 2, 1971 entitled "Method of Applying a Backing to a Carpet and Product," now U.S. Pat. No. 3,700,515, issued Oct. 24, 1972.

DISCLOSURE

This invention relates to a method of applying a secondary backing to a previously tufted primary backing material wherein an essentially non-solvent and non-aqueous adhesive system is employed. More particularly, the invention concerns the use of an adhesive system which may be made to polymerize and set or cure during a relatively short period of time and at either ambient or elevated temperatures.

Presently, the large majority of the world's carpets and carpet-type materials are prepared by a tufting process whereby yarn is interlaced through a primary backing material so that a portion of the yarn known as the bundle protrudes through the underside of the primary backing. After the interlacing step, a secondary backing, generally jute, is adhesively applied and secured to the underside of the primary backing to cover the bundle and provide dimensional stability and drape while enhancing the tuft lock of the yarn, i.e. the strength with which the tufted yarn is retained by the primary backing. Conventionally, the adhesive used to laminate the secondary backing to the underside of the primary backing includes a solvent system and/or a significant quantity of water. The solvent and/or water must be removed after application of the adhesive to cause polymerization and curing of the adhesive. Such an operation has in the past required the usage of relatively expensive and complicated drying equipment. In addition, this conventional equipment normally occupied relatively large expanses of floor space and required great lengths of time to effectively and efficiently complete a drying operation.

To be suitable for usage in carpet backing laminations an adhesive must retain tufted yarn in place, secure the individual fibers of the yarn in position, prevent pilling of the yarn, control dimensional stability (handle or drape) and retain the secondary backing securely to the underside of the primary backing material. Also, it is extremely important that the adhesive not migrate through the primary backing and into the exposed portions of the tufted yarn. If such migration occurs, the yarn becomes stiff and the final carpet will be unacceptable.

Presently, a widely-used adhesive system is based upon a latex or a carboxylated latex that is applied to the underside of the primary backing. The water in the latex system will on occassion migrate through the primary backing into the exposed yarn, but the adhesive is retained by the primary backing and the bundle. The latex adhesive is then cured after application and the final carpet is dried in conventional large ovens at relatively elevated temperatures. The curing and drying process is quite costly due to the large expense of the ovens, energy requirement, floor space requirements and labor to operate the ovens.

Figure 2:
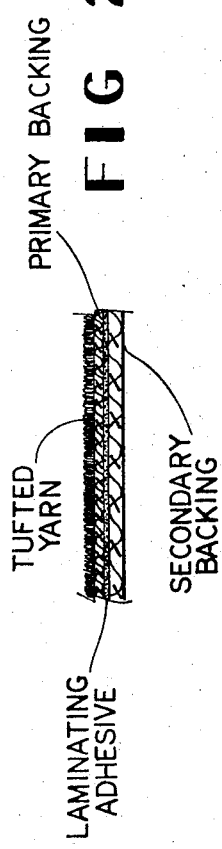

It is an object of the present invention therefore, to provide a process for laminating a secondary backing material to a previously tufted primary backing material through the use of relatively inexpensive equipment which requires only moderate lengths of time and low temperatures for curing of the adhesive system. Other objects, features and advantages of the present invention will become apparent from a review of the following detailed description when taken in conjunction with the accompanying drawing wherein:

FIG. 1 represents in schematic form one embodiment of the equipment required for the present process; and FIG. 2 is a cross-section of a tufted carpet product taken along lines 2—2 of FIG. 1.

In accordance with the present invention, there is provided a process for laminating a secondary backing material to a previously tufted primary backing material through the use of an essentially non-aqueous and non-solvent adhesive system. As shown in FIG. 1 of the drawing, a supply 10 of previously tufted primary jute-backing material 11 in roll form is positioned upon a carpet unroll cradle 12 which is immediately adjacent a carpet storage table 14. The previously tufted primary backing material is fed from cradle 12 past a railway sew on station 16 to a storage area 18. Railway sew on station 16 is used in joining consecutive rolls of primary backing material so that the operation of the process may be continuous even though different types of carpet material are fed through the system. Storage area 18 provides an accumulation of primary backing material so that the railway sew on equipment may have sufficient time to accomplish the joining of adjacent rolls of primary backing material.

Following storage station 18, the primary backing material 11 is fed over a series of rollers 20 to adhesive application station 22. At this station, a traversing mixing head and applicator 24 applies a supply of adhesive material to the back and bundle of primary backing material. Traversing head 24 is caused to traverse in reciprocal fashion across the width of backing material through conventional traversing operation equipment 25. Adhesive material is supplied to head 24 from reservoir 28 through supply conduit 26.

Immediately following application of adhesive material, the primary backing material including the coat of adhesive passes under doctor blade 30 which serves to evenly distribute and regulate the thickness of adhesive material upon the backing material. The coated primary backing material is then passed across a tenter section 31 including endless belt 32. Through the movement of belt 32 and the operation of the tenter section, this section of the process serves to stretch and retain the coated backing material in a proper position for an adhesive dwell time period as discussed later in this specification.

A pair of optional pre-heaters 34 are provided immediately above the tenter section of the process. If desirable, these heaters may be actuated to provide a degree of initial curing for the adhesive. In a preferred operation, the pre-heaters are not necessary and are not required.

A supply of jute secondary backing is passed from a remote jute let-off station 36 to be positioned immediately adjacent the coated primary backing material for adhesion thereto following the tenter section of the process. The secondary backing and primary backing then pass through a pair of pinch rolls 38 which supply sufficient compressive force to bear the two backing materials against one another. Following the pinch rolls, the carpet material of secondary backing and tufted primary backing is passed around a portion of the circumference of three vertically stacked rotating drying drums 40. During passage around the initial drum and following drying drums, the secondary backing is positioned immediately adjacent the drum surface so that the heat supplied by the drum will be most immediately available to the adhesive system. The supply of carpet is passed around rollers 42 which serve to position the carpet material against the heating drums. The carpet material is then removed across further rollers 44 and collected at a roll-up station 46. If desirable, suitable trimming stations may be positioned immediately adjacent drying drums 40 to trim the carpet to a desired width. In addition, cooling areas may also be provided for reduction in temperature of the carpet material.

During application of the adhesive material to the primary backing material, it has been found that a suitable concentration of adhesive is between 4 and 42 ounces of adhesive material per square yard of backing material. A preferred concentration is between 12 and 18 ounces of adhesive material per square yard of backing material and a particularly preferred concentration is between 14 and 16 ounces of adhesive material per square yard of backing material.

While the coated backing material is passing through the tenter section, a dwell time of between 5 seconds and 30 minutes for the adhesive material is provided. Preferably this dwell time is less than one minute. During the dwell time, the adhesive material chemically expands during the preliminary stage of its polymerization reaction and is absorbed by the bundle of exposed yarn on the primary backing material to achieve wrap thereof. Approximately 60% bundle wrap is obtained during the dwell period. When the carpet material reaches the heating drums and the temperature of the adhesive is elevated, viscosity of the adhesive drops and 100% bundle wrap is achieved.

The time and temperature factors provided by heating drums 40 are particularly critical to the operation of the present process. It has been found that temperatures of between about 70° and 300° F. are suitable for the operation of the present process. Preferred temperatures are between 100° and 250° F. The time of heating for the carpet material has been found to be suitable when in the range of between 10 minutes and 10 seconds. A preferred range for heating time is between 8 minutes and 30 seconds. It may be seen that with the present process it is possible to use temperatures which are low enough to preserve the integrity of conventional synthetic carpet fibers.

Typical running times from the doctor blade 30 to exit from heating drums 40 for the present process is approximately ¾ of one minute to approximately 3 minutes. This may be compared with conventional running times of between 30 minutes and several hours. In addition, with this equipment, running speeds may be as high as 60 feet a minute while with conventional equipment running speeds of between 8 and 12 feet are generally available.

A particularly critical aspect of the present invention is the nature of the adhesive system. In this process an essentially non-solvent, non-aqueous adhesive system is employed. This system is stable under conventional materials handling conditions but may be made to polymerize and set or cure during a short period of time at from ambient up to elevated temperatures. Such non-solvent, non-aqueous adhesive systems include urethanes and epoxies.

A urethane adhesive system of this process is a thixotropic polymerization product of a mixture of a polyol having a hydroxyl number less than one hundred, a small amount of water, a polyisocyanate, a filler and a catalyst system that promotes a polymerization reaction between the isocyanate and the polyol to form a polyurethane within a short time after mixing. Penetration of the thixotropic polyurethane composition into the bundle of exposed carpet yarn is controlled by regulating carefully its initial viscosity, its thixotropicity, its pot life and the amount of adhesive expansion during reaction so that the bundle of yarn is at least 90 percent saturated with polyurethane adhesive without significant penetration through the primary backing and into the exposed portions of the tufted carpet yarn.

The thixotropic polyurethane composition is prepared by charging an aqueous polyol composition and a polyisocyanate composition separately to reservoir 28 where the reactants are intimately mixed. Before a significant degree of polymerization and blowing occurs, the resultant mixture is evenly applied to the underside of the primary backing material by means of mixing head 24 and doctor blade 30. The thixotropic nature of the polyurethane reaction product in combination with the shear forces created by application of the mixture with a doctor blade causes a sufficient reduction in the viscosity of the blend of reactants and product to promote spreading thereof. A polymerization reaction between the polyisocyanate, water and polyol is initiated when the reactants are mixed so that the reaction occurs both prior to and after the mixture-composition passes under the doctor blade. After passing the blade, the mixture-composition thickens due to its thixotropic nature so that migration of the composition into the tufted yarn on the upper side of the primary backing is prevented. The small amount of water in the composition besides promoting the polymerization also causes controlled foaming to improve adhesive migration into the bundle of yarn before the composition is cured and reduces the amount of composition needed to attain desired adhesion for the secondary backing.

The thixotropic polyurethane material must have a Brookfield viscosity of between about 30,000 and 100,000 cps. as measured at 10 r.p.m. #7 spindle on a Brookfield RVF viscometer to prevent migration thereof into the exposed yarn while permitting it to liquify sufficiently under application of force and be spread by means of a doctor blade. The Brookfield viscometer and its operation is described in "Development of Research Technique for Evaluating the Low Temperature Fluidity of Automatic Transmission Fluids," published by Coordinating Research Council, Inc., February 1963, appendix A, and designated as CRC L–45–1262. It has been found that migration cannot be prevented merely by increasing the viscosity of the composition but that it is necessary that the composition be thixotropic. In order to attain these characteristics, it is essential that the polyol employed have a hydroxyl number less than one hundred, preferably less than fifty. As is well known in the art, the hydroxyl number is defined as the number of milligrams of potassium hydroxide required for the complete neutralization of the hydrolysis product of the fully acetylated derivative prepared from one gram of polyether polyol. It is necessary that the polyol have a low hydroxyl number to reduce the concentration of the diisocyanate needed to effect complete reaction of the reactants to form the polyurethane. When employing liquid diisocyanates, increased amounts of diisocyanate reduce the viscosity and thixotropocity of the resultant composition below that desired to prevent migration of the composition into the exposed yarn. On the other hand, when a solid diisocyanate reactant is employed, increased amounts thereof will cause the resultant composition to be paste-like rendering it very difficult to spread. Accordingly, while low molecular weight polyols can be employed with solid diisocyanates and high molecular weight polyols can be employed with liquid diisocyanates, in each case the hydroxyl number of the polyol must be low to attain proper physical characteristics of the resultant composition. Accordingly, when employing solid diisocyanates reactants, the polyol should have a molecular weight between about 1000 and 3000 to attain the proper viscosity characteristics of the resultant composition. On the other hand, when the liquid diisocyanate reactant is employed, the polyol should have a molecular weight of between about 3000 and about 9000 to attain the desired viscosity characteristics of the resultant composition.

In one aspect of the present invention, a polyurethane prepolymer can be employed to replace or to be mixed with the polyol in the composition. These prepolymers are prepared by means well known in the art, i.e., by incomplete reaction of a polyol with a diisocyanate. The molecular weight of the prepolymer and the type of diisocyanate should be selected while bearing in mind the considerations described above.

While careful selection of the polyol or prepolymer and the diisocyanate provide a means for controlling the viscosity of the resultant composition, the composition cannot be made thixotropic to the desired degree by controlling the relative concentrations of only these two reactants. A suitable filler must be added in amounts sufficient to render the overall composition thixotropic to the desired degree but less than that which will cause the composition to become excessively viscous and paste-like. The concentration of filler is dependent upon the type of filler employed since the degree of thixotropicity varies with the filler used. Generally, the filler is employed in amounts of between about 15 and 300 parts per one hundred parts of polyol or prepolymer reactant. Representative suitable fillers include silica, asbestos, calcium carbonate, zinc oxide, clay, feldspar, or the like, or mixtures thereof. When fillers are employed, such as silica or calcium carbonate, it is preferred that additional fillers be added to attain the desired level of thixotropicity. It is preferred to employ asbestos powder as the filler either alone or in conjunction with another filler such as calcium carbonate as satisfactory thixotropic characteristics are achieved with asbestos and it additionally reduces the flammability of the composition.

The type of catalyst system employed in preparation of the thixotropic polyurethane composition should regulate the pot life (i.e., the time for a 100 percent viscosity increase) thereof to between 10 and about 60 seconds at moderate temperatures of up to about 23° C. It is preferred that from .03 to one part of catalyst per one hundred parts of polyol be used in the reaction mixture.

Blowing or foaming the polyurethane composition is effected by controlling both the catalyst system and the water concentration. Generally, water is present in the reaction mass from between about .01 and .75 part per hundred parts polyol, over and above the water normally present as absorbed on the filler. Since this is such a small quantity of water, the present adhesive system is considered non-aqueous and described as such. Conventionally, adhesive systems contain as much as 50% water. The catalyst system not only must effect rapid curing at ambient or elevated temperatures but also must control formation of carbon dioxide resulting from the reaction of water and diisocyanate. Blowing should be controlled to effect adhesive expansion between about 100 percent and 400 percent, preferably between about 200 percent and 300 percent, so that the bundle of yarn is saturated with adhesive. Suitable catalysts are those which promote polyurethane formation at a high rate but do no promote the blowing reaction in preference to the polyurethane reaction. Preferred catalysts are organic metal compounds, amines, and metal soaps; such catalysts include dibutyl tin dilaurate and stannous octoate.

Suitable polyols which can be employed in the present invention are the polyether polyols having a functionality of at least two, an average molecular weight between about 1000 and 9000 and a hydroxyl number less than one hundred. Such polyols include polybutylene glycol, polyethylene glycol, polypropylene glycol, 1,2-polydimethylene glycol, polydecamethylene glycol and mixtures thereof. When using a liquid diisocyanate reactant, preferred polyols have an average molecular weight of between 4000 and 8000, and particularly preferred polyols have a molecular weight of between 6000 and 7000. When using a solid diisocyanate reactant, preferred polyols have an average molecular weight of between 1200 and 2800, and particularly preferred polyols have a molecular weight of between 1500 and 2500.

A variety of polyisocyanates may be reacted with these polyols to obtain satisfactory polyurethane adhesives. Particularly suitable polyisocyanates are aromatic diisocyanates as they are more reactive and less toxic than the aliphatic diisocyanates. Such diisocyanates include 2,4-toluene diisocyanate, 2,6-toluene diisocyanate, methane, diisocyanate, naphthylene 1,4-diisocyanate, diphenylmethane - 4,4'-diisocyanate, 3,3'-dimethoxy biphenylene diisocyanate, 4,4-diphenylene diisocyanate and mixtures thereof. The diisocyanate usually is employed in stoichiometric excess to assure complete reaction with the functional groups of the polyol and with the water which is present. Preferably from 18 to 50 parts of diisocyanate per one hundred parts of polyol are used in the reaction mass.

Another method of preparation of the polyurethane adhesive is possible and practical. By addition of from one to three parts of selected surfactants or surface additive agents per one hundred parts of polyol rather than water, it is possible to mechanically froth or entrain air into the polyurethane compound rather than chemically foam the compound and produce a stable froth of air and polyurethane adhesive. A general formulation for preparation of said adhesive is:

| Material: | Parts |
|---|---|
| Polyol or (other hydroxyl containing material) | 100.00 |
| Asbestos | 10.00 |
| Dibutyl tin dilaurate | .06 |
| Surfactant | 3.00 |
| Colorant | .50 |
| Diisocyanate | 30.00 |

The froth of the above formulation is applied by suitable doctoring means to the underside of a tufted primary backing, jelled and then cured as described previously. Suitable surfactants include silicon surfactant compounds from Union Carbide Company and Dow Chemical Company.

The present invention will be described further by the following examples.

EXAMPLE I

To a mixing head apparatus adapted to spread a mixture onto the underside of a tufted primary backing material are separately charged (1) 100.0 pounds of polypropylene glycol having a hydroxyl number of about twenty-five and a molecular weight of 6500; 0.50 pound of water; 15.0 pounds of asbestos powder having an average particle size of about 5–50 microns; 100.0 pounds of calcium carbonate having an average particle size of about 50–150 microns; and 0.05 pound of dibutyl tin dilaurate and (2) 30 pounds of modified diphenylmethane-4-4-diisocyanate (supplied by the Upjohn Company and identified as Isonate 143L). The resultant mixture has an initial viscosity of about 88,000 when measured on a Brookfield viscometer with spindle No. 7 at 10 r.p.m. RVF. A primary backing material, through which nylon yarn has been tufted, is then fed under the mixing head. The thixotropic polyurethane mixture is applied to the primary backing and exposed bundle of yarn at a rate of 18 ounces of mixture per square yard of backing by means of a doctor blade and allowed to foam to a general thickness of approximately ¼ of an inch. A secondary backing is applied to the layer of adhesive and the combination of primary backing and secondary backing is then passed between two pinch rollers where the backings and the adhesive are subjected to a pressure of about 4 p.s.i. to crush substantially all the cells formed in the adhesive during the foaming thereof. The resulting laminate of primary backing and secondary backing is then passed over a portion of the circumference of a series of vertically stacked heating cans where heat at 135° C. is applied to the secondary backing to set and cure the adhesive material.

The resulting laminated carpet product is then tested for strength by the delamination, bundle wrap and tuft lock tests. The carpet is found to have a tuft lock of about 25 pounds. The bundle wrap is found to be about 100% saturated with polyurethane adhesive and there is no migration of the polyurethane past the primary backing.

EXAMPLE II

The following general formulation,

| Material: | Pounds |
| --- | --- |
| Triol polyethylene glycol (M.W. 6,000) | 100.00 |
| Asbestos | 10.00 |
| Filler (calcium carbonate) | 75.00 |
| Dibutyl tin dilaurate | 0.03 |
| Silicone surfactant (Dow Chemical Company) | 3.00 |
| Diisocyanate prepolymer of the diisocyanate of Example I and polypropylene glycol; the prepolymer provides a free NCO percentage of approximately 34% with an isocyanate equivalent of approximately 140 | 31.00 | is metered and blended with dry air in the head of a mechanical frothing machine, such as is conventionally employed to froth latex, candies, and food products. The agitation produced in the frothing head produces an adhesive-air froth of approximately 17 pounds per cubic foot density. This froth is poured into a puddle behind a doctoring blade which meters approximately 38 ounces per square yard at about ⅜ of an inch thick onto the carpet backing. The adhesive compound is then cured as described in Example I.

It should be understood that conventional backing materials which may be used in this process include woven jute, cotton and synthetic fiber backings, woven strips of polyolefin material, sheets of polyolefin material, needled and non-woven backing materials and the like. Conventional carpet yarns for use in this process include natural fibers such as cotton and wool and synthetic fibers such as nylon, polyester, polyolefin and the like.

While this invention has been described in detail with particular reference to preferred embodiments thereof, it will be understood that variations and modifications can be effected within the spirit and scope of the invention as described hereinbefore and as defined in the appended claims.

What is claimed is:

1. Process for preparing a tufted carpet product including a primary backing having carpet yarn interlaced therethrough to provide an upperside of the backing which presents a major portion of the interlaced yarn and an underside of the backing which presents the bundle of carpet yarn, a secondary backing, and a layer of adhesive material between the underside of the primary backing and the secondary backing for securing the two backings together, said process comprising the steps of:

(A) passing the underside of the primary backing past an application station where a thixotropic polyurethane adhesive material is applied to the underside of the primary backing and the bundle of carpet yarn;

(B) applying a secondary backing to the underside of the primary backing and the adhesive material with sufficient force to cause bonding between the two backings; and (C) supplying heat to the secondary backing and adhesive material at a temperature of from about 70° F. to about 300° F. for a period of about 10 seconds to about 10 minutes to cause polymerization and curing of the adhesive material by passing the secondary backing and primary backing around a portion of the circumference of at least one rotating heated drum with the secondary backing being positioned immediately adjacent the surface of the heated drum.

2. Process of claim 1 wherein the primary backing is continuously passed under an application station where adhesive material is continuously applied to the underside of the primary backing and bundle of carpet yarn, and doctored to a uniform thickness; and the adhesive material is a thixotropic polyurethane composition having a viscosity of between 30,000 and 100,000 as measured on spindle No. 7, 10 r.p.m., RVF of a Brookfield viscometer and having a pot life of between about 10 and 60 seconds, said polyurethane composition being prepared from a polyol having a hydroxyl number less than 100 and a functionality of at least two, a diisocyanate, a catalyst, and a filler to render the composition thixotropic.

3. Process of claim 2 wherein the polyol is selected from the group consisting of polybutylene glycol, polyethylene glycol, 1,2-polydimethylene glycol, polydecamethylene glycol, and mixtures thereof; the diisocyanate is aromatic and is selected from the group consisting of 2,4-toluene diisocyanate, 2,6-toluene diisocyanate, methane diisocyanate, naphthylene 1,4,-diisocyanate, diphenylmethane - 4,4' - diisocyanate, 3,3'-dimethoxy biphenylene diisocyanate, 4,4-diphenylene diisocyanate and mixtures thereof; the filler is selected from the group consisting of silica, asbestos, calcium carbonate, zinc oxide, clay feldspar and mixtures thereof; and the reaction mass includes sufficient water to effect between 100 percent and 400 percent chemical expansion of the composition during reaction of the polyol and the diisocyanate.

4. Process of claim 2 wherein from one to three parts of a surfactant are included in the polyurethane reaction mixture and the mixture is mechanically agitated with the addition of dry air prior to application of the mixture to the primary backing.

5. Process for preparing a textile product including a primary backing having an upperside and an underside, a secondary backing, and a layer of thixotropic polyurethane adhesive material between the underside of the primary backing and the secondary backing for securing the two backings together, said process comprising the steps of:
(A) passing the underside of the primary backing past an application station where a thixotropic polyurethane adhesive material is applied to the underside of the primary backing by mixing thixotropic polyure-ethane adhesive material is applied to the underside thane reactants in a mixing and dispensing head and immediately dispensing the mixture onto the underside of the primary backing;
(B) applying a secondary backing to the underside of the primary backing and the adhesive material with sufficient force to cause bonding between the two backings; and
(C) supplying heat to the secondary backings at a temperature of from about 70° F. to about 300° F. for a period of about 10 seconds to about 10 minutes to cause polymerization and curing of the adhesive material.

References Cited

UNITED STATES PATENTS

| | | | |
|---|---|---|---|
| 3,046,177 | 1/1962 | Hankins | 264—47 |
| 3,709,750 | 1/1973 | Minshell | 161—67 |
| 3,717,524 | 2/1973 | Culp et al. | 161—66 |
| 3,513,046 | 5/1970 | Westfield | 156—72 |
| 3,219,502 | 11/1965 | Willy | 156—79 |
| 2,512,727 | 6/1950 | Rice | 156—73 |
| 3,700,515 | 10/1972 | Terry | 156—72 |
| 3,519,526 | 7/1970 | Carey et al. | 161—66 |
| 3,554,824 | 1/1971 | Callahan | 156—72 |

DOUGLAS J. DRUMMOND, Primary Examiner

F. FRISENDA, Jr., Assistant Examiner

U.S. Cl. X.R.

156—79, 331, 324, 499

UNITED STATES PATENT OFFICE
CERTIFICATE OF CORRECTION

Patent No. 3,806,385          Dated April 23, 1974

Inventor(s) C. E. TERRY

It is certified that error appears in the above-identified patent and that said Letters Patent are hereby corrected as shown below:

5. Process for preparing a textile product including a primary backing having an upperside and an underside, a secondary backing, and a layer of thixotropic polyurethane adhesive material between the underside of the primary backing and the secondary backing for securing the two backings together, said process comprising the steps of:

(A) passing the underside of the primary backing past an application station where a thixotropic polyurethane adhesive material is applied to the underside of the primary backing by mixing thixotropic polyurethane reactants in a mixing and dispensing head and immediately dispensing the mixture onto the underside of the primary backing;

(B) applying a secondary backing to the underside of the primary backing and the adhesive material with sufficient force to cause bonding between the two

UNITED STATES PATENT OFFICE
CERTIFICATE OF CORRECTION

Patent No. 3,806,385　　　　　　　Dated April 23, 1974

Inventor(s) C. E. TERRY　　　　　　　Page 2 of 2

It is certified that error appears in the above-identified patent and that said Letters Patent are hereby corrected as shown below:

backings; and (C) supplying heat to the secondary backings at a temperature of from about 70°F. to about 300°F. for a period of about 10 seconds to about 10 minutes to cause polymerization and curing of the adhesive material.

Signed and sealed this 13th day of August 1974.

(SEAL)
Attest:

McCOY M. GIBSON, JR.　　　　C. MARSHALL DANN
Attesting Officer　　　　　　Commissioner of Patents